United States Patent
Xu et al.

(10) Patent No.: US 10,318,033 B2
(45) Date of Patent: Jun. 11, 2019

(54) ANTI-REFLECTIVE LAYER, TOUCH SUBSTRATE, TOUCH PANEL, AND PORTABLE ELECTRONIC APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Jiawei Xu, Beijing (CN); Lei Zhang, Beijing (CN); Tsung Chieh Kuo, Beijing (CN); Wenjin Fan, Beijing (CN); Chaoke Zhang, Beijing (CN)

(73) Assignees: BOE TECHNOLOGY GROUP CO., LTD., Beijing (CN); HEFEI XINXHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/560,912

(22) PCT Filed: Mar. 28, 2017

(86) PCT No.: PCT/CN2017/078438
§ 371 (c)(1),
(2) Date: Sep. 22, 2017

(87) PCT Pub. No.: WO2018/014584
PCT Pub. Date: Jan. 25, 2018

(65) Prior Publication Data
US 2018/0253174 A1    Sep. 6, 2018

(30) Foreign Application Priority Data
Jul. 22, 2016  (CN) .......................... 2016 1 0584879

(51) Int. Cl.
*G06F 3/041*    (2006.01)
*G06F 3/00*    (2006.01)
(Continued)

(52) U.S. Cl.
CPC ............ *G06F 3/0412* (2013.01); *G02B 1/115* (2013.01); *G06F 1/1643* (2013.01); *G06F 3/00* (2013.01);
(Continued)

(58) Field of Classification Search
USPC .................................................. 345/173–174
See application file for complete search history.

(56) References Cited

U.S. PATENT DOCUMENTS

2005/0287479 A1* 12/2005 Moon ...................... G03F 7/091
430/330
2007/0170430 A1* 7/2007 Nakagawa ........ G02F 1/136227
257/66
(Continued)

FOREIGN PATENT DOCUMENTS

CN          1716627 A      1/2006
CN        105084773 A     11/2015

OTHER PUBLICATIONS

International Search Report & Written Opinion dated Jul. 4, 2017, regarding PCT/CN2017/078438.

*Primary Examiner* — Kwin Xie
(74) *Attorney, Agent, or Firm* — Intellectual Valley Law, P.C.

(57) ABSTRACT

The present application discloses a touch substrate including a base substrate; a transparent touch electrode layer on the base substrate; and an anti-reflective layer on a side of the transparent touch electrode layer distal to the base substrate. The anti-reflective layer includes a first sub-layer on a side of the transparent touch electrode layer distal to the base
(Continued)

substrate; a second sub-layer on a side of the first sub-layer distal to the transparent touch electrode layer; and a third sub-layer on a side of the second sub-layer distal to the first sub-layer. The first sub-layer, the second sub-layer, and the third sub-layer are laminated together. The second sub-layer has a refractive index greater than those of the first sub-layer and the third sub-layer.

14 Claims, 4 Drawing Sheets

(51) Int. Cl.
*G06F 3/0354* (2013.01)
*G02B 1/115* (2015.01)
*G06F 1/16* (2006.01)

(52) U.S. Cl.
CPC .......... *G06F 3/03547* (2013.01); *G06F 3/041* (2013.01); *G02F 2201/12* (2013.01)

(56) References Cited

U.S. PATENT DOCUMENTS

| | | | | |
|---|---|---|---|---|
| 2011/0057279 A1* | 3/2011 | Lee | ................... | H01L 27/14609 |
| | | | | 257/432 |
| 2013/0194220 A1* | 8/2013 | Lee | ........................ | G06F 3/041 |
| | | | | 345/173 |
| 2013/0278514 A1* | 10/2013 | Jeon | ........................ | G06F 3/041 |
| | | | | 345/173 |

* cited by examiner

ANTI-REFLECTIVE LAYER, TOUCH SUBSTRATE, TOUCH PANEL, AND PORTABLE ELECTRONIC APPARATUS

CROSS-REFERENCE TO RELATED APPLICATION

This application is a national stage application under 35 U.S.C. § 371 of International Application No. PCT/CN2017/078438, filed Mar. 28, 2017, which claims priority to Chinese Patent Application No. 201610584879.8, filed Jul. 22, 2016, the contents of which are incorporated by reference in the entirety.

TECHNICAL FIELD

The present invention relates to display technology, more particularly, to an anti-reflective layer, a touch substrate, a touch panel and a portable electronic apparatus.

BACKGROUND

Touch display panels have found a wide range of applications in the display field such as mobile phones, computer display panels, touch screens, satellite navigation devices, and digital cameras. Touch display panels can be categorized into three classes: add-on mode touch panels, on-cell touch panels, and in-cell touch panels. Touch display panels may be a self-capacitive type or a mutual capacitive type touch display panel. Conventional touch control display panels typically use indium tin oxide (ITO) as the touch electrode material.

SUMMARY

In one aspect, the present invention provides a touch substrate comprising a base substrate; a transparent touch electrode layer on the base substrate; and an anti-reflective layer on a side of the transparent touch electrode layer distal to the base substrate; wherein the anti-reflective layer comprises a first sub-layer on a side of the transparent touch electrode layer distal to the base substrate; a second sub-layer on a side of the first sub-layer distal to the transparent touch electrode layer, and a third sub-layer on a side of the second sub-layer distal to the first sub-layer; wherein the first sub-layer, the second sub-layer, and the third sub-layer are laminated together; and the second sub-layer has a refractive index greater than those of the first sub-layer and the third sub-layer.

Optionally, the transparent touch electrode layer has a refractive index greater than that of the first sub-layer.

Optionally, the transparent touch electrode layer comprises indium tin oxide.

Optionally, the first sub-layer and the third sub-layer are made of a same material; and the second sub-layer is made of a material different from that of the first sub-layer and the third sub-layer.

Optionally, the first sub-layer and the third sub-layer are made of silicon dioxide; and the second sub-layer is made of a material comprising $SiO_xN_y$, wherein x>0, and y>0.

Optionally, an average visible light reflective rate of the anti-reflective layer is no more than 1.5%.

Optionally, an average visible light transmissive rate of the anti-reflective layer is greater than 92%.

Optionally, the refractive index of the second sub-layer is in a range of approximately 1.46 to approximately 2.0.

Optionally, the transparent touch electrode layer has a thickness in a range of approximately 40 nm to approximately 50 nm; the first sub-layer has a thickness in a range of approximately 10 nm to approximately 20 nm; the second sub-layer has a thickness in a range of approximately 50 n to approximately 75 nm; and the third sub-layer has a thickness in a range of approximately 90 nm to approximately 110 nm.

In another aspect, the present invention provides a touch panel comprising the touch substrate described herein.

In another aspect, the present invention provides a portable electronic apparatus comprising a display panel; a touch substrate attached to the display panel; and an image capturing device comprising a lens mounted on the portable electronic apparatus; wherein the touch substrate has a window region configured to allow the lens to receive light; the touch substrate in the window region comprises a base substrate; and an anti-reflective layer on the base substrate; wherein the anti-reflective layer comprises a first sub-layer on the base substrate; a second sub-layer on a side of the first sub-layer distal to the base substrate; and a third sub-layer on a side of the second sub-layer distal to the first sub-layer; wherein the first sub-layer, the second sub-layer, and the third sub-layer are laminated together; and the second sub-layer has a refractive index greater than those of the first sub-layer and the third sub-layer.

Optionally, the first sub-layer and the third sub-layer are made of a same material; and the second sub-layer is made of a material different from that of the first sub-layer and the third sub-layer.

Optionally, the first sub-layer and the third sub-layer are made of silicon dioxide; and the second sub-layer is made of a material comprising $SiO_xN_y$, wherein x>0, and y>0.

Optionally, a light transmissive rate of the anti-reflective layer is greater than 95% at a wavelength of approximately 550 nm.

Optionally, the refractive index of the second sub-layer is in a range of approximately 1.46 to approximately 2.0.

In another aspect, the present invention provides an anti-reflective layer comprising a first sub-layer; a second sub-layer on the first sub-layer, and a third sub-layer on a side of the second sub-layer distal to the first sub-layer; wherein the first sub-layer, the second sub-layer, and the third sub-layer are laminated together; and the second sub-layer has a refractive index greater than those of the first sub-layer and the third sub-layer.

Optionally, the first sub-layer and the third sub-layer are made of a same material; and the second sub-layer is made of a material different from that of the first sub-layer and the third sub-layer.

Optionally, the first sub-layer and the third sub-layer are made of silicon dioxide; and the second sub-layer is made of a material comprising $SiO_xN_y$, wherein x>0, and y>0.

Optionally, an average visible light reflective rate of the anti-reflective layer is no more than 1.5%.

Optionally, a light transmissive rate of the anti-reflective layer is greater than 95% at a wavelength of approximately 550 nm.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
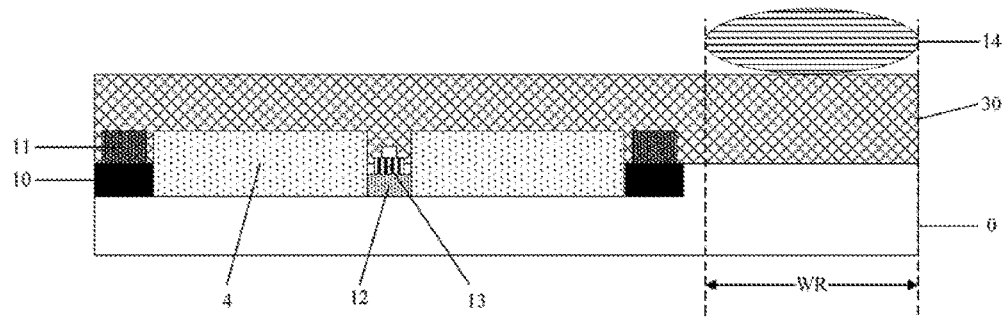
FIG. 1 is a schematic diagram illustrating the structure of a conventional touch substrate.

FIG. 1 is a schematic diagram illustrating the structure of a conventional touch substrate. Referring to FIG. 1, the conventional touch substrate includes a base substrate 0, transparent touch electrode layer 4 on the base substrate 0, and a pattern blanking layer 30 on a side of the transparent touch electrode layer 4 for blanking the patterns of the transparent touch electrode layer 4. The transparent touch electrode layer 4 includes a plurality of transparent touch electrode blocks connected by a plurality of metal bridges 12. The conventional touch substrate further includes an insulating layer 13 on a side of the plurality of metal bridges 12 distal to the base substrate 0. Moreover, the conventional touch substrate includes a black matrix 10 and a plurality of signal lines 11 in peripheral regions. Some conventional touch substrates are part of an electronic apparatus that has a camera for taking pictures, e.g., a front side camera in a mobile phone. The electronic apparatus includes a lens 14, and the touch substrate further includes a window region WR for allowing the lens 14 to receive light. In the window region, the conventional touch substrate includes the pattern blanking layer 30 on the base substrate 0.

Typically, the pattern blanking layer 30 in the conventional touch substrate is made of a material having a high refractive index, e.g., silicon oxynitride, in order to achieve an acceptable blanking effect. The transparent touch electrode layer 4 is typically made of indium tin oxide. Because both the indium tin oxide and the silicon oxynitride have relatively high refractive indexes, the reflective rate of the transparent touch electrode layer 4 is relatively high. A conventional anti-reflective film attached to an electronic apparatus having the touch substrate can only reduce light reflection on the glass side (the base substrate side), but not the light reflection from the transparent touch electrode layer 4.

Moreover, the light reflective rates of the transparent touch electrode layer 4/pattern blanking layer 30 vary greatly over visible light spectrum, resulting in significant color shift in a touch panel having the conventional touch substrate.

In the window region WR, the combination of the pattern blanking layer 30 and the glass (the base substrate 0) enhances light reflection, resulting in a relatively low light transmissive rate. To enhance the light transmission to the lens 14, the pattern blanking layer 30 in the window region WR is sometimes etched. However, the pattern blanking layer 30 in the window region WR may be under-etched or over-etched, resulting in an inferior light transmissive rate in the window region WR.

Accordingly, the present disclosure provides, inter alia, an anti-reflective layer, a touch substrate, a touch panel and a portable electronic apparatus that substantially obviate one or more of the problems due to limitations and disadvantages of the related art. In one aspect, the present disclosure provides an anti-reflective layer including a first sub-layer, a second sub-layer on the first sub-layer; and a third sub-layer on a side of the second sub-layer distal to the first sub-layer, the first sub-layer, the second sub-layer, and the third sub-layer laminated together. In the present anti-reflective layer, the second sub-layer has a refractive index greater than those of the first sub-layer and the third sub-layer.

Figure 2:
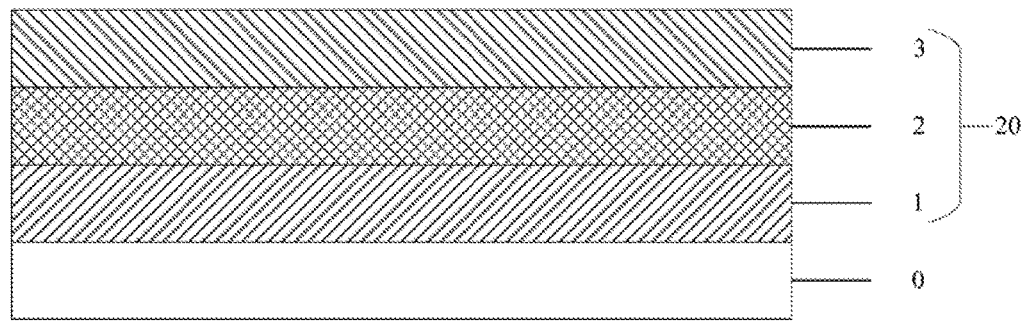
FIG. 2 is a schematic diagram illustrating the structure of an anti-reflective layer in some embodiments according to the present disclosure.

FIG. 2 is a schematic diagram illustrating the structure of an anti-reflective layer in some embodiments according to the present disclosure. Referring to FIG. 2, the anti-reflective layer 20 in some embodiments includes a first sub-layer 1; a second sub-layer 2 on the first sub-layer 1; and a third sub-layer 3 on a side of the second sub-layer 2 distal to the first sub-layer 1. Optionally, the first sub-layer 1, the second sub-layer 2, and the third sub-layer 3 are laminated together. In the present anti-reflective layer 20, the second sub-layer 2 has a refractive index greater than those of the first sub-layer 1 and the third sub-layer 3.

Examples of appropriate transparent optical materials for making the second sub-layer 2 include, but are not limited to, silicon oxynitride, a material including phosphorus pentoxide and silicon dioxide ($P_2O_5$—$SiO_2$), niobium oxide, titanium oxide, tantalum oxide, and silicon nitride. Examples of appropriate transparent optical materials for making the first sub-layer 1 and the third sub-layer 3 include, but are not limited to, silicon dioxide and magnesium fluoride. Regardless the specific choice of the transparent optical materials for the sub-layers, the materials for making the first sub-layer 1 and the third sub-layer 3 have a refractive index less than that for making the second sub-layer 2. For example, silicon dioxide has a refractive index of 1.4585, and magnesium fluoride has a refractive index of 1.3777. Niobium oxide has a refractive index of 2.3404, titanium oxide has a refractive index of 2.6142, tantalum oxide has a refractive index of 2.1306, silicon nitride has a refractive index of 2.0458. Silicon oxynitride has a refractive index that can be tuned between approximately 1.46 to approximately 2.0, depending on the ratio of oxygen and nitrogen in the compound.

Optionally, the refractive index for the second sub-layer 2 is greater than those of the first sub-layer 1 and the third sub-layer 3 by at least 15%, e.g., by at least 20%, by at least 25% or by at least 30%. Optionally, the refractive index of the second sub-layer 2 is no less than 1.55. Optionally, the refractive index of the first sub-layer 1 and the third sub-layer 3 is less than 1.5.

The second sub-layer 2 is made of a material different from that of the first sub-layer 1 and the third sub-layer 3.

Optionally, the first sub-layer 1 and the third sub-layer 3 are made of a same material having a refractive index less than that of the second sub-layer 2. Optionally, the first sub-layer 1 and the third sub-layer 3 are made of different materials, either one of which has a refractive index less than that of the second sub-layer 2.

In some embodiments, the second sub-layer 2 is made of a material including $SiO_xN_y$, wherein x>0, and y>0. Optionally, the refractive index of the second sub-layer 2 is in a range of approximately 1.46 to approximately 2.0. Optionally, the refractive index of the second sub-layer 2 is in a range of approximately 1.8 to approximately 2.0. Optionally, the refractive index of the second sub-layer 2 is approximately 1.9.

Optionally, the first sub-layer 1 and the third sub-layer 3 are both made of silicon dioxide. Optionally, the first sub-layer 1 and the third sub-layer 3 are both made of magnesium fluoride. Optionally, the first sub-layer 1 is made of silicon dioxide and the third sub-layer 3 is made of magnesium fluoride. Optionally, the first sub-layer 1 is made of magnesium fluoride and the third sub-layer 3 is made of silicon dioxide.

In some embodiments, the first sub-layer 1 has a thickness in a range of approximately 10 nm to approximately 20 nm, e.g., approximately 15 nm. Optionally, the second sub-layer 2 has a thickness in a range of approximately 35 nm to approximately 80 nm, e.g., approximately 50 nm to approximately 75 nm. Optionally, the second sub-layer 2 has a thickness of approximately 70 nm. Optionally, the second sub-layer 2 has a thickness of approximately 60 nm. Optionally, the third sub-layer 3 has a thickness in a range of approximately 90 nm to approximately 110 nm. Optionally, the third sub-layer 3 has a thickness of approximately 100 nm.

Optionally, a ratio of a thickness of the second sub-layer 2 to a thickness of the first sub-layer 1 is in a range of approximately 2:1 to approximately 6:1, e.g., approximately 3:1 to approximately 5:1. Optionally, a ratio of a thickness of the second sub-layer 2 to a thickness of the first sub-layer 1 is approximately 4.6:1.

Optionally, a ratio of a thickness of the third sub-layer 3 to a thickness of the first sub-layer 1 is in a range of approximately 6:1 to approximately 7.5:1. Optionally, a ratio of a thickness of the third sub-layer 3 to a thickness of the first sub-layer 1 is approximately 6.66:1.

Optionally, a thickness d of the third sub-layer 3 is determined according to the following equation:

$$n*d=(\lambda/4)*(2k-1)$$

wherein k is a positive integer, n is the refractive index of the third sub-layer 3, and $\lambda$ is a wavelength of light, e.g., a wavelength of a visible light. Optionally, an optimal light transmissive rate may be achieved when the thickness d of the third sub-layer 3 satisfies the above equation.

As compared to conventional anti-reflective layers, the present anti-reflective layer 20 has exceptional anti-reflective properties. For example, in the conventional anti-reflective layer, an average visible light reflective rate of the anti-reflective layer is approximately 5.25%, and an average visible light transmissive rate of the anti-reflective layer is approximately 88%. In the present anti-reflective layer 20, an average visible light reflective rate of the anti-reflective layer is no more than 2.5%, e.g., no more than 2.0%, no more than 1.5%, or no more than 1.3%. In the present anti-reflective layer 20, an average visible light transmissive rate of the anti-reflective layer is greater than 90%, e.g., greater than 92%. Moreover, the present anti-reflective layer 20 has a light transmissive rate at a wavelength of approximately 550 nm greater than 90%, e.g., greater than 95%.

Figure 3:
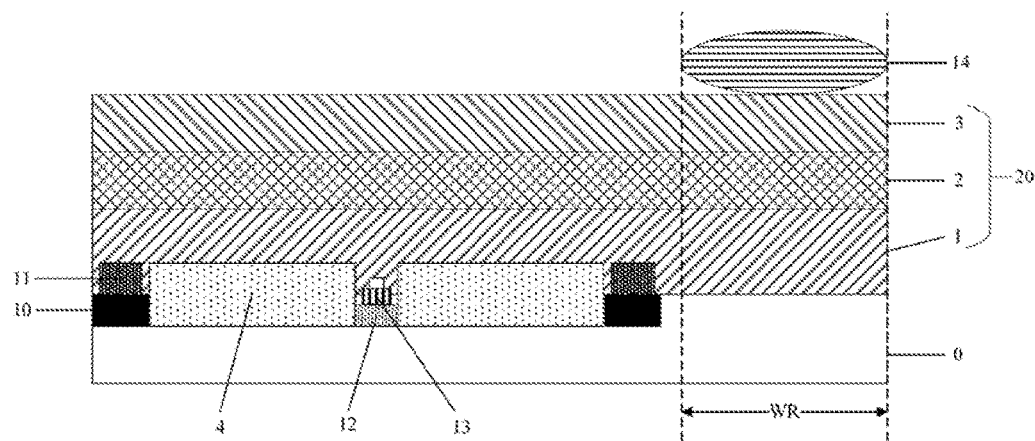
FIG. 3 is a schematic diagram illustrating the structure of a touch substrate in some embodiments according to the present disclosure.

In another aspect, the present disclosure provides a touch substrate having an anti-reflective layer described herein. FIG. 3 is a schematic diagram illustrating the structure of a touch substrate in some embodiments according to the present disclosure. Referring to FIG. 3, the touch substrate in some embodiments includes a base substrate 0; a transparent touch electrode layer 4 on the base substrate 0; and an anti-reflective layer 20 on a side of the transparent touch electrode layer 4 distal to the base substrate 0. The anti-reflective layer 20 includes a first sub-layer 1 on a side of the transparent touch electrode layer 4 distal to the base substrate 0; a second sub-layer 2 on a side of the first sub-layer 1 distal to the transparent touch electrode layer 4; and a third sub-layer 3 on a side of the second sub-layer 2 distal to the first sub-layer 1. Optionally, the first sub-layer 1, the second sub-layer 2, and the third sub-layer 3 are laminated together. In the present anti-reflective layer 20, the second sub-layer 2 has a refractive index greater than those of the first sub-layer 1 and the third sub-layer 3.

The transparent touch electrode layer 4 has a refractive index greater than that of the first sub-layer 1. Optionally, the transparent touch electrode layer 4 is made of a transparent metal oxide material including $M1O_x$, wherein M1 is a single metal or a combination of metals and x>0. Examples of transparent metal oxides include, but are not limited to, indium tin oxide, indium zinc oxide, indium gallium oxide, and indium gallium zinc oxide. Optionally, the transparent touch electrode layer 4 has a refractive index greater than that of the first sub-layer 1. For example, indium tin oxide ($In_2O_3$—$SnO_2$) has a refractive index of 1.8270, indium gallium zinc oxide has a refractive index of 1.85.

In some embodiments, the touch substrate further includes a plurality of metal bridges 12 connecting a plurality of transparent touch electrode blocks of the transparent touch electrode layer 4, an insulating layer 13 on a side of the plurality of metal bridges 12 distal to the base substrate 0, and a black matrix 10 and a plurality of signal lines 11 in peripheral regions. Optionally, the touch substrate is part of an electronic apparatus that has a camera for taking pictures, e.g., a front side camera in a mobile phone. The electronic apparatus includes a lens 14, and the touch substrate further includes a window region WR for allowing the lens 14 to receive light.

Examples of appropriate transparent optical materials for making the second sub-layer 2 include, but are not limited to, silicon oxynitride, a material including phosphorus pentoxide and silicon dioxide ($P_2O_5$—$SiO_2$), niobium oxide, titanium oxide, tantalum oxide, and silicon nitride. Examples of appropriate transparent optical materials for making the first sub-layer 1 and the third sub-layer 3 include, but are not limited to, silicon dioxide and magnesium fluoride. Regardless the specific choice of the transparent optical materials for the sub-layers, the materials for making the first sub-layer 1 and the third sub-layer 3 have a refractive index less than that for making the second sub-layer 2. Optionally, the refractive index for the second sub-layer 2 is greater than those of the first sub-layer 1 and the third sub-layer 3 by at least 15%, e.g., by at least 20%, by at least 25% or by at least 30%. Optionally, the refractive index of the second sub-layer 2 is no less than 1.55. Optionally, the refractive index of the first sub-layer 1 and the third sub-layer 3 is less than 1.5. The second sub-layer 2 is made of a material different from that of the first sub-layer 1 and the third sub-layer 3. Optionally, the first sub-layer 1 and the third sub-layer 3 are made of a same material having a refractive index less than that of the second sub-layer 2. Optionally, the first sub-layer 1 and the third sub-layer 3 are made of different materials, either one of which has a refractive index less than that of the second sub-layer 2. Optionally, the first sub-layer 1 and the third sub-layer 3 are both made of silicon dioxide. Optionally, the first sub-layer 1 and the third sub-layer 3 are both made of magnesium fluoride. Optionally, the first sub-layer 1 is made of silicon dioxide and the third sub-layer 3 is made of magnesium fluoride. Optionally, the first sub-layer 1 is made of magnesium fluoride and the third sub-layer 3 is made of silicon dioxide. In some embodiments, the second sub-layer 2 is made of a material including $SiO_xN_y$, wherein x>0, and y>0. Optionally, the refractive index of the second sub-layer 2 is in a range of approximately 1.46 to approximately 2.0. Optionally, the refractive index of the second sub-layer 2 is in a range of approximately 1.8 to approximately 2.0. Optionally, the refractive index of the second sub-layer 2 is approximately 1.9.

In some embodiments, the first sub-layer 1 has a thickness in a range of approximately 10 nm to approximately 20 nm, e.g., approximately 15 nm. Optionally, the second sub-layer 2 has a thickness in a range of approximately 35 nm to approximately 80 nm, e.g., approximately 50 nm to approximately 75 nm. Optionally, the second sub-layer 2 has a thickness of approximately 70 nm. Optionally, the second sub-layer 2 has a thickness of approximately 60 nm. Optionally, the third sub-layer 3 has a thickness in a range of approximately 90 nm to approximately 110 nm. Optionally, the third sub-layer 3 has a thickness of approximately 100 nm. Optionally, the transparent touch electrode layer 4 has a thickness in a range of approximately 40 nm to approximately 50 nm. Optionally, the transparent touch electrode layer 4 has a thickness of approximately 45 nm. Optionally, a ratio of a thickness of the second sub-layer 2 to a thickness of the first sub-layer 1 is in a range of approximately 2:1 to approximately 6:1, e.g., approximately 3:1 to approximately 5:1. Optionally, a ratio of a thickness of the second sub-layer 2 to a thickness of the first sub-layer 1 is approximately 4.6. Optionally, a ratio of a thickness of the third sub-layer 3 to a thickness of the first sub-layer 1 is in a range of approximately 6:1 to approximately 7.5:1. Optionally, a ratio of a thickness of the third sub-layer 3 to a thickness of the first sub-layer 1 is approximately 6.66. Optionally, a ratio of a thickness of the transparent touch electrode layer 4 to a thickness of the first sub-layer 1 is in a range of approximately 2.5:1 to approximately 3.5:1. Optionally, a ratio of a thickness of the transparent touch electrode layer 4 to a thickness of the first sub-layer 1 is approximately 3:1.

Optionally, a thickness d of the third sub-layer 3 is determined according to the following equation:

$$n*d=(\lambda/4)*(2k-1)$$

wherein k is a positive integer, n is the refractive index of the third sub-layer 3, and $\lambda$ is a wavelength of light, e.g., a wavelength of a visible light. Optionally, an optimal light transmissive rate may be achieved when the thickness d of the third sub-layer 3 satisfies the above equation.

Figure 4:
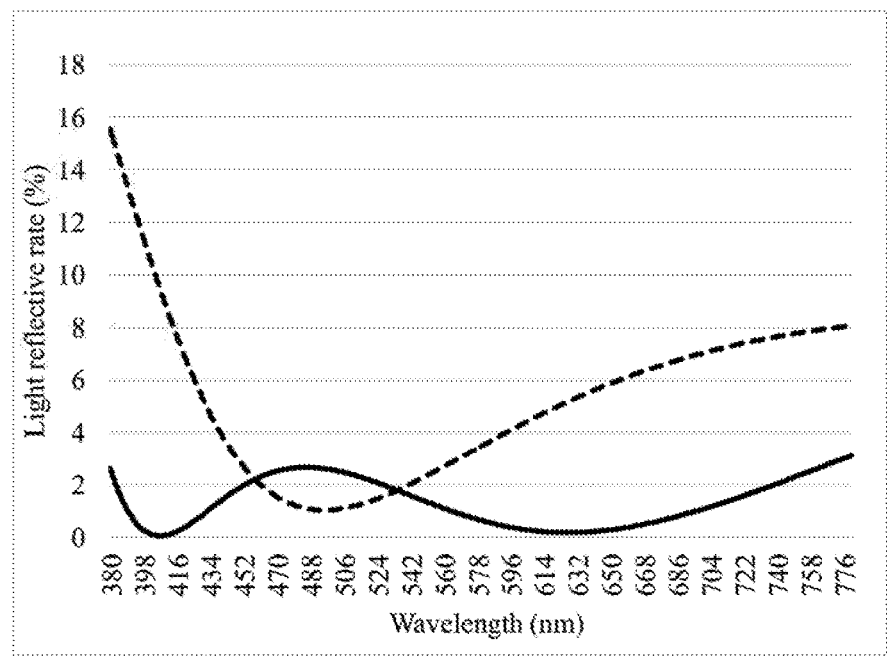
FIG. 4 is a graph showing a comparison between light reflective rates between a conventional touch substrate (dotted line) and a touch substrate in some embodiments according to the present disclosure (solid line).

FIG. 4 is a graph showing a comparison between light reflective rates between a conventional touch substrate (dotted line) and a touch substrate in some embodiments according to the present disclosure (solid line). Referring to FIG. 4, in the conventional touch substrate (a silicon oxynitride layer of 90 nm on an indium tin oxide layer of 45 nm), an average visible light reflective rate is approximately 5.25%. In a touch substrate according to the present disclosure having an indium tin oxide layer of 45 nm, a first sub-layer of 15 nm silicon dioxide, a second sub-layer of 70 nm silicon oxynitride, and a third sub-layer of 100 nm silicon dioxide, an average visible light reflective rate is approximately 1.3% or lower. Moreover, in the conventional touch substrate, the light reflective rates vary greatly over the visible light spectrum, resulting in significant color shift. Particularly, the light reflective rates are higher in the blue/green light wavelength range as compared to other light wavelength ranges, resulting in blue color shift or green color shift in the convention touch substrate. In contrast, the light reflective rates vary only in a narrow range over the visible light spectrum in the present touch substrate, obviating the color shift issue in the conventional touch substrate. Thus, a broadband anti-reflective effect is achieved in the present touch substrate.

Figure 5:
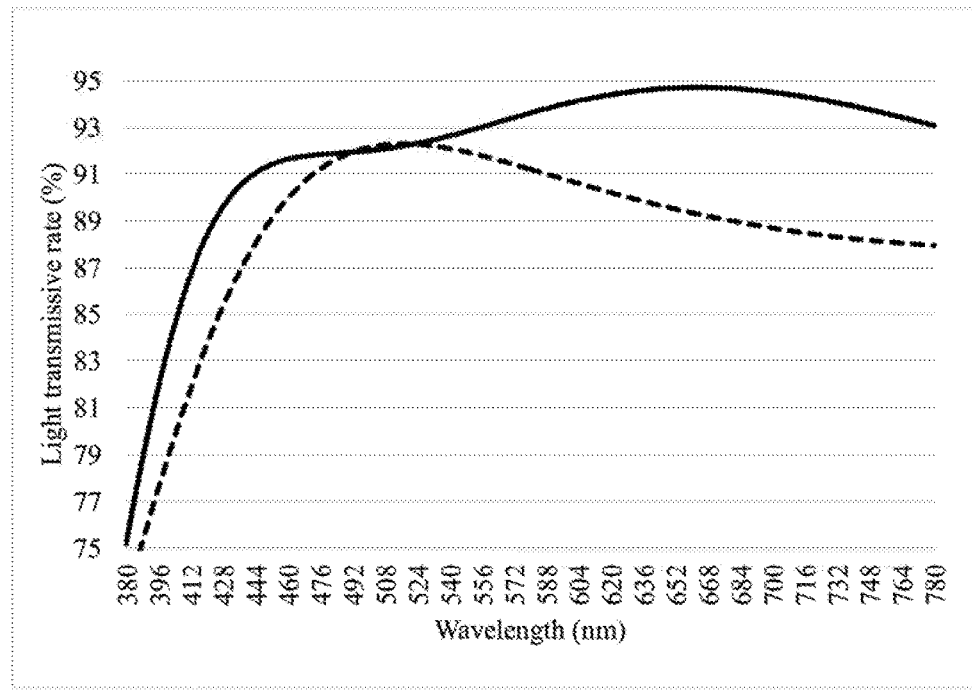
FIG. 5 is a graph showing a comparison between light transmissive rates between a conventional touch substrate (dotted line) and a touch substrate in some embodiments according to the present disclosure (solid line).

FIG. 5 is a graph showing a comparison between light transmissive rates between a conventional touch substrate (dotted line) and a touch substrate in some embodiments according to the present disclosure (solid line). Referring to FIG. 4, in the conventional touch substrate (a silicon oxynitride layer of 90 nm on an indium tin oxide layer of 45 nm), an average visible light transmissive rate is as low as 88%. In a touch substrate according to the present disclosure having an indium tin oxide layer of 45 nm, a first sub-layer of 15 nm silicon dioxide, a second sub-layer of 70 nm silicon oxynitride, and a third sub-layer of 100 nm silicon dioxide, an average visible light transmissive rate as high as 92% or above is achieved.

Figure 6:
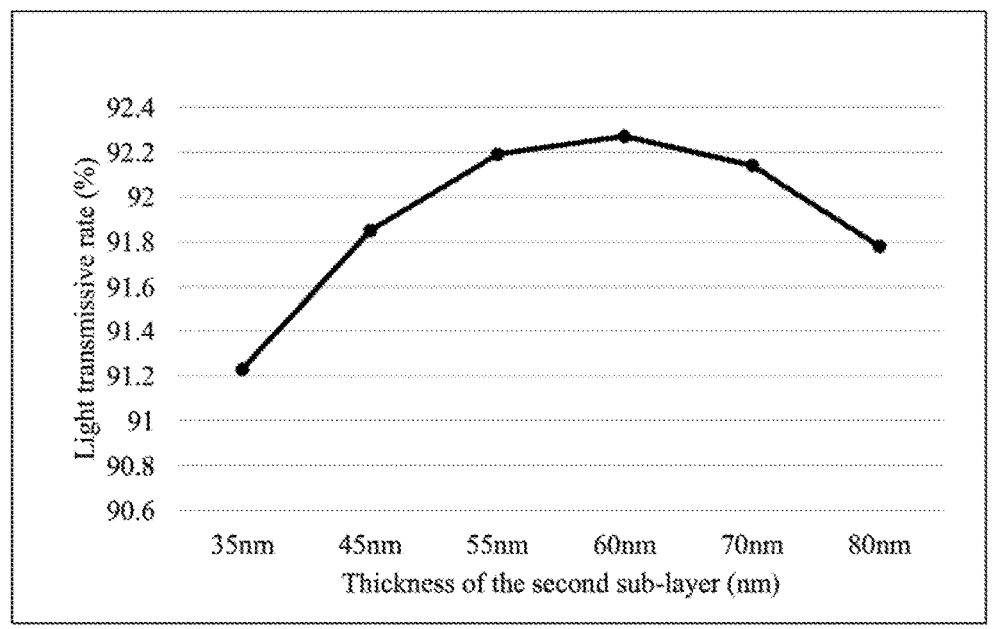
FIG. 6 is a graph showing a correlation between the light transmissive rate and the thickness of the second sub-layer in a touch substrate in some embodiments according to the present disclosure.

FIG. 6 is a graph showing a correlation between the light transmissive rate and the thickness of the second sub-layer in a touch substrate in some embodiments according to the present disclosure. Referring to FIG. 6, the average visible light transmissive rate may be tuned by changing the thickness of the second sub-layer 2. When the thickness of the second sub-layer 2 is in a range of approximately 50 nm to approximately 75 nm, an average visible light transmissive rate higher than 92% may be achieved. For example, an average visible light transmissive rate higher than 92.2% may be achieved at a thickness of approximately 60 nm.

Referring to FIG. 3, the touch substrate in the window region WR includes a base substrate 0 and an anti-reflective layer 20 on the base substrate 0. The transparent touch electrode layer 4 is absent in the window region. The anti-reflective layer 20 in some embodiments includes a first sub-layer 1; a second sub-layer 2 on the first sub-layer 1; and a third sub-layer 3 on a side of the second sub-layer 2 distal to the first sub-layer 1. Optionally, the first sub-layer 1, the second sub-layer 2, and the third sub-layer 3 are laminated together. In the present anti-reflective layer 20, the second sub-layer 2 has a refractive index greater than those of the first sub-layer 1 and the third sub-layer 3.

Figure 7:
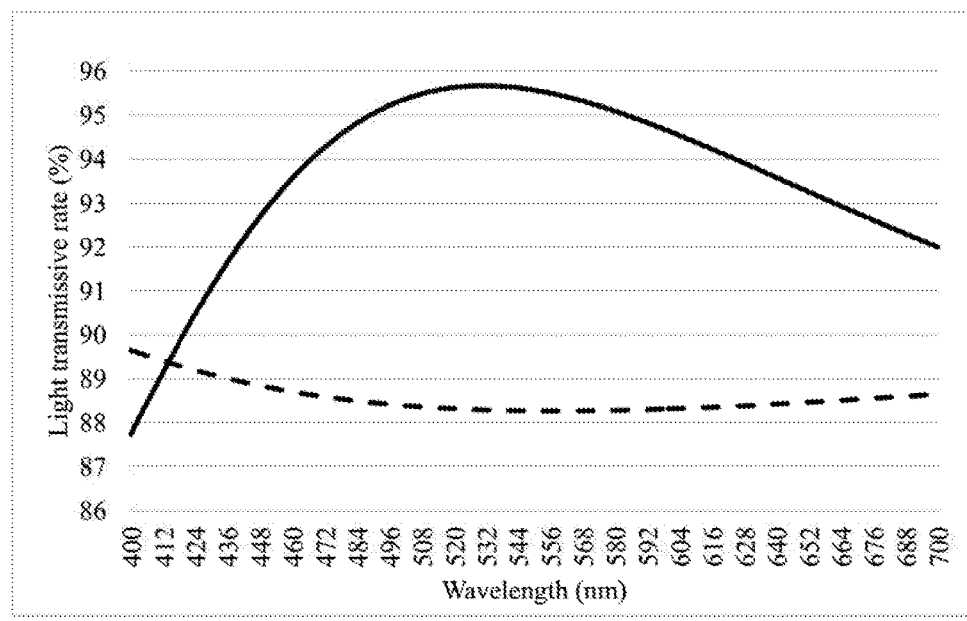
FIG. 7 is a graph showing a comparison between light transmissive rates between window regions for camera lens in a conventional touch substrate (dotted line) and a touch substrate in some embodiments according to the present disclosure (solid line).

FIG. 7 is a graph showing a comparison between light transmissive rates between window regions for camera lens in a conventional touch substrate (dotted line) and a touch substrate in some embodiments according to the present disclosure (solid line). Referring to FIG. 7, in the window region of a conventional touch substrate (a silicon oxynitride layer of 90 nm on a base substrate 0 made of glass), an average visible light transmissive rate is as low as 88%. In the window region of a touch substrate according to the present disclosure having a first sub-layer of 15 nm silicon dioxide, a second sub-layer of 70 nm silicon oxynitride, and a third sub-layer of 100 nm silicon dioxide, an average visible light transmissive rate as high as 95% or above is achieved. The present touch substrate obviates the needs of etching the silicon oxynitride layer in the window region or an add-on anti-reflective film on the glass side, leading to the simplified fabricating process and lower manufacturing costs.

In another aspect, the present disclosure provides a touch panel having a touch substrate as described herein. Optionally, the touch panel is a one-glass-solution type touch panel. Optionally, the touch panel is a glass-film-film type touch panel. Optionally, the touch panel is an on-cell touch panel. Optionally, the touch panel is an add-on type touch panel. Optionally, the touch panel is an in-cell touch panel.

In another aspect, the present disclosure provides a display apparatus having a touch panel described herein. Examples of appropriate display apparatuses include, but are not limited to, an electronic paper, a mobile phone, a tablet computer, a television, a monitor, a notebook computer, a digital album, a gaming system, etc.

In another aspect, the present disclosure provides a portable electronic apparatus having a touch panel described herein. In some embodiments, the portable electronic apparatus further includes a display panel, onto which the touch substrate is attached, and an image capturing device including a lens mounted on the portable electronic apparatus. Examples of appropriate portable electronic apparatuses include, but are not limited to, a mobile phone, a tablet computer, a notebook computer, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A portable electronic apparatus, comprising:
   a display panel;
   a touch substrate attached to the display panel; and
   an image capturing device comprising a lens mounted in a window region configured to allow the lens to receive light, the display panel and the touch substrate being completely absent in the window region;
   wherein the portable electronic apparatus in the window region comprises:
   a base substrate;
   a first sub-layer on the base substrate;
   a second sub-layer on a side of the first sub-layer away from the base substrate;
   a third sub-layer on a side of the second sub-layer away from the first sub-layer; and
   the lens on a side of the third sub-layer away from the second sub-layer;
   wherein the first sub-layer, the second sub-layer, and the third sub-layer are laminated together;
   the second sub-layer is in contact with the first sub-layer, and is in contact with the third sub-layer;
   the second sub-layer has a refractive index greater than those of the first sub-layer and the third sub-layer; and
   a thickness of the second sub-layer is in a range of 50 nm to 75 nm.

2. The portable electronic apparatus of claim 1, wherein the first sub-layer and the third sub-layer are made of a same material; and
   the second sub-layer is made of a material different from that of the first sub-layer and the third sub-layer.

3. The portable electronic apparatus of claim 1, wherein the first sub-layer and the third sub-layer are made of silicon dioxide; and
   the second sub-layer is made of a material comprising $SiO_xN_y$, wherein x>0, and y>0.

4. The portable electronic apparatus of claim 1, wherein a light transmissive rate of the anti-reflective layer is greater than 95% at a wavelength of approximately 550 nm.

5. The portable electronic apparatus of claim 1, wherein the refractive index of the second sub-layer is in a range of approximately 1.46 to approximately 2.0.

6. The portable electronic apparatus of claim 1, wherein the first sub-layer has a thickness in a range of approximately 10 nm to approximately 20 nm; and
   the third sub-layer has a thickness in a range of approximately 90 nm to approximately 110 nm.

7. The portable electronic apparatus of claim 1, wherein the display panel is absent in the window region.

8. The portable electronic apparatus of claim 1, wherein a touch electrode layer is absent in the window region.

9. The portable electronic apparatus of claim 1, wherein the lens is directly adjacent to the third sub-layer.

10. The portable electronic apparatus of claim 1, wherein an average visible light reflective rate of the anti-reflective layer is no more than 1.5%.

11. The portable electronic apparatus of claim 1, wherein an average visible light transmissive rate of the anti-reflective layer is greater than 92%.

12. The portable electronic apparatus of claim 1, wherein the lens is completely within the window region.

13. The portable electronic apparatus of claim 1, wherein the anti-reflective layer extends from a display area of the display panel into the window region.

14. The portable electronic apparatus of claim 1, wherein the window region is in a peripheral region of the display panel.

* * * * *